United States Patent [19]
Frye et al.

[11] 3,780,675
[45] Dec. 25, 1973

[54] PLASMA ARC REFUSE DISINTEGRATOR

[75] Inventors: James A. Frye, Oklahoma City;
Ralph B. Morton, Del City; Charles
W. Vogler, Oklahoma City, all of
Okla.

[73] Assignee: The Boardman Company,
Oklahoma City, Okla.

[22] Filed: Apr. 18, 1972

[21] Appl. No.: 245,216

[52] U.S. Cl. .............................. 110/8 E, 110/18 E
[51] Int. Cl. ............................................. F23g 5/10
[58] Field of Search ................... 219/383; 110/8 A, 110/8 E, 18 E

[56] References Cited
UNITED STATES PATENTS

| | | | |
|---|---|---|---|
| 3,173,388 | 3/1965 | Menrath et al. | 110/8 |
| 3,648,630 | 3/1972 | Hobbs et al. | 110/8 |
| 3,027,445 | 3/1962 | Johnson | 110/8 X |
| 3,503,347 | 3/1970 | Marr, Jr. et al. | 110/8 |

Primary Examiner—Kenneth W. Sprague
Attorney—David H. Semmes

[57] ABSTRACT

A refuse disintegrator utilizing a plasma arc for the reduction of solid waste materials to an ionized gaseous state through heat oxidation, leaving only sterilized residues and resulting in almost total elimination of all materials introduced into the system. The system in operation utilizes a thermal reduction theory designed to break down all classes of refuse through the application of extreme high temperature, releasing the internal energy of all matter and provides a highly efficient and economic system and process susceptible of automated control depending upon the nature of emission from the system.

12 Claims, 5 Drawing Figures

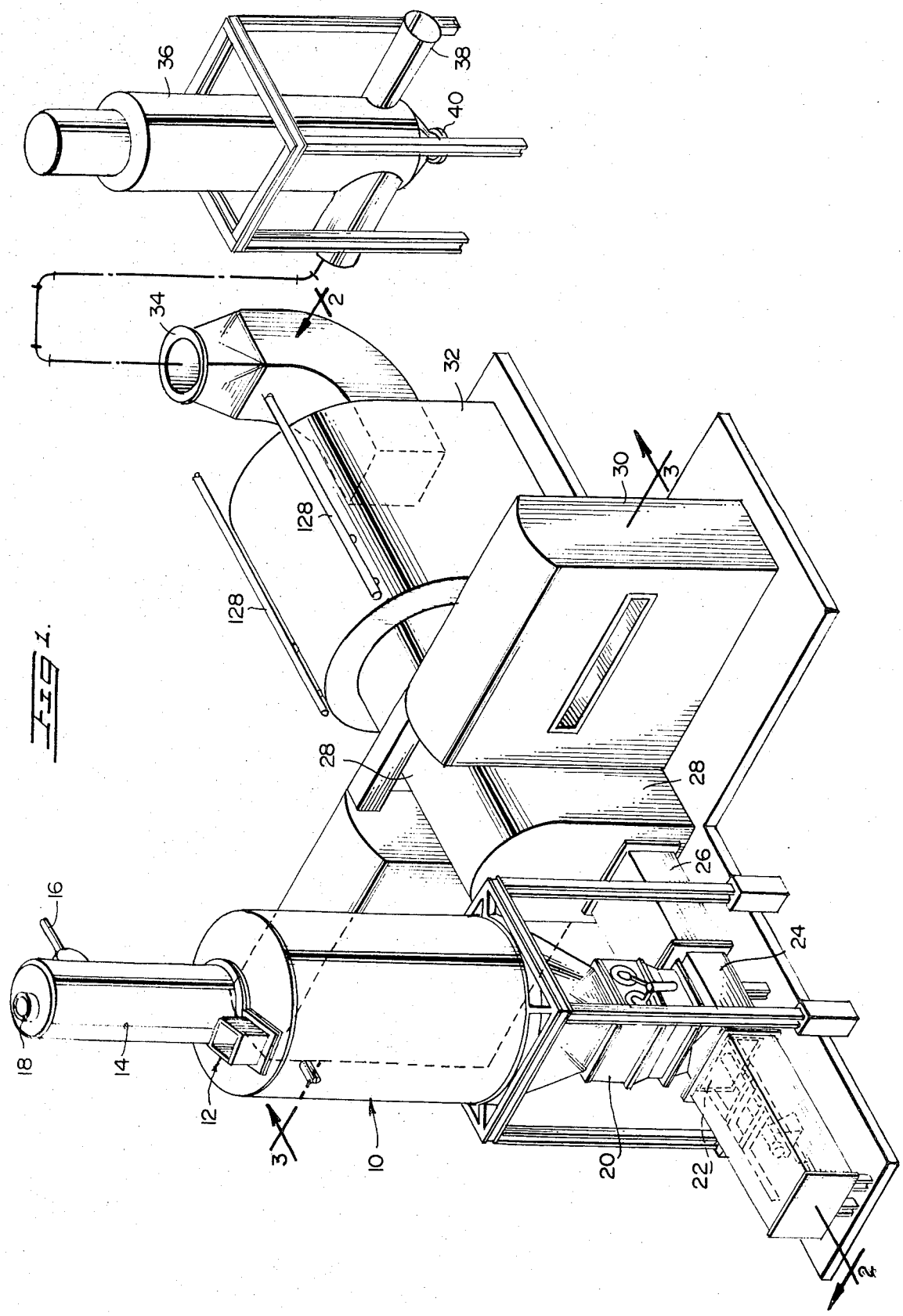

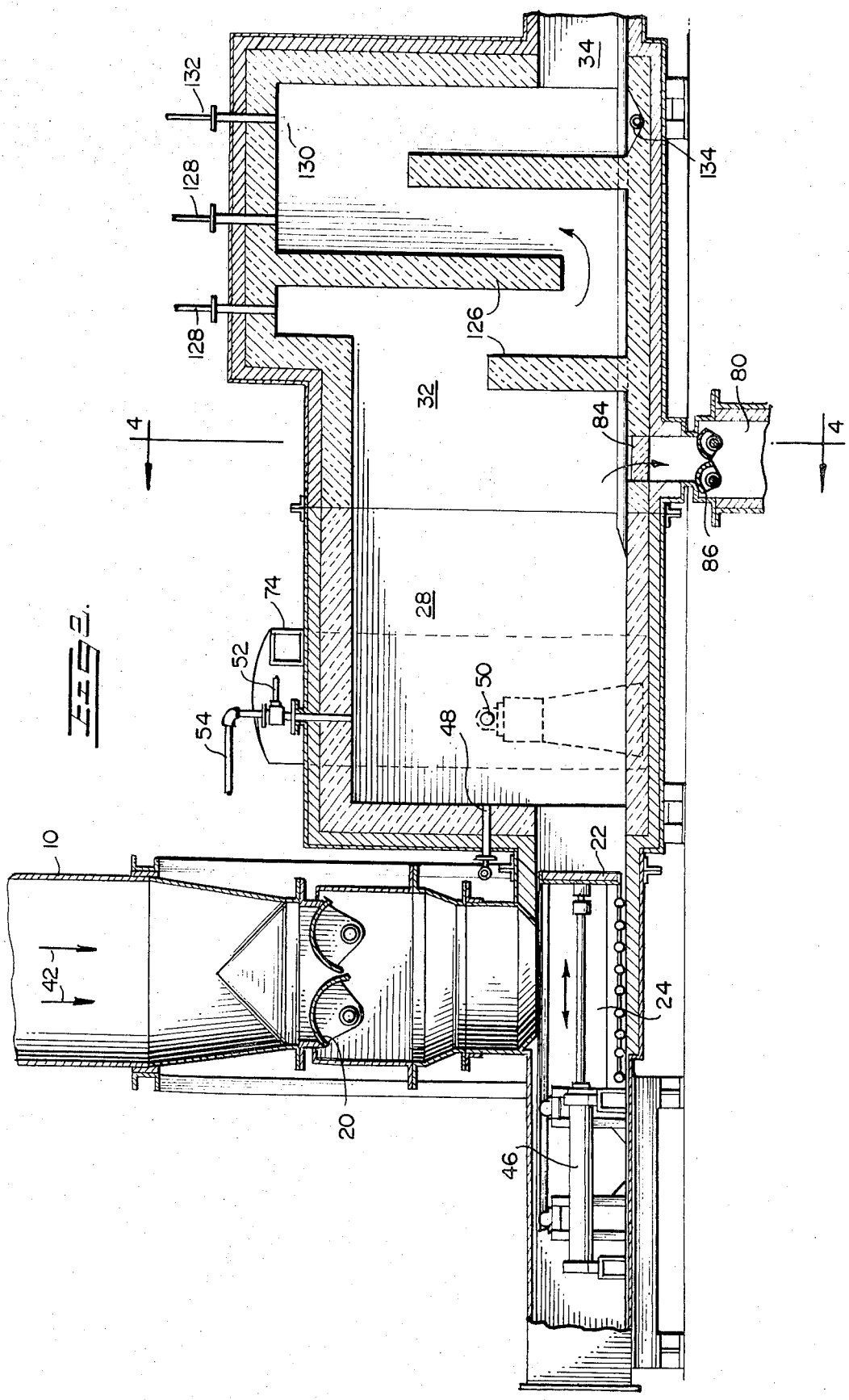

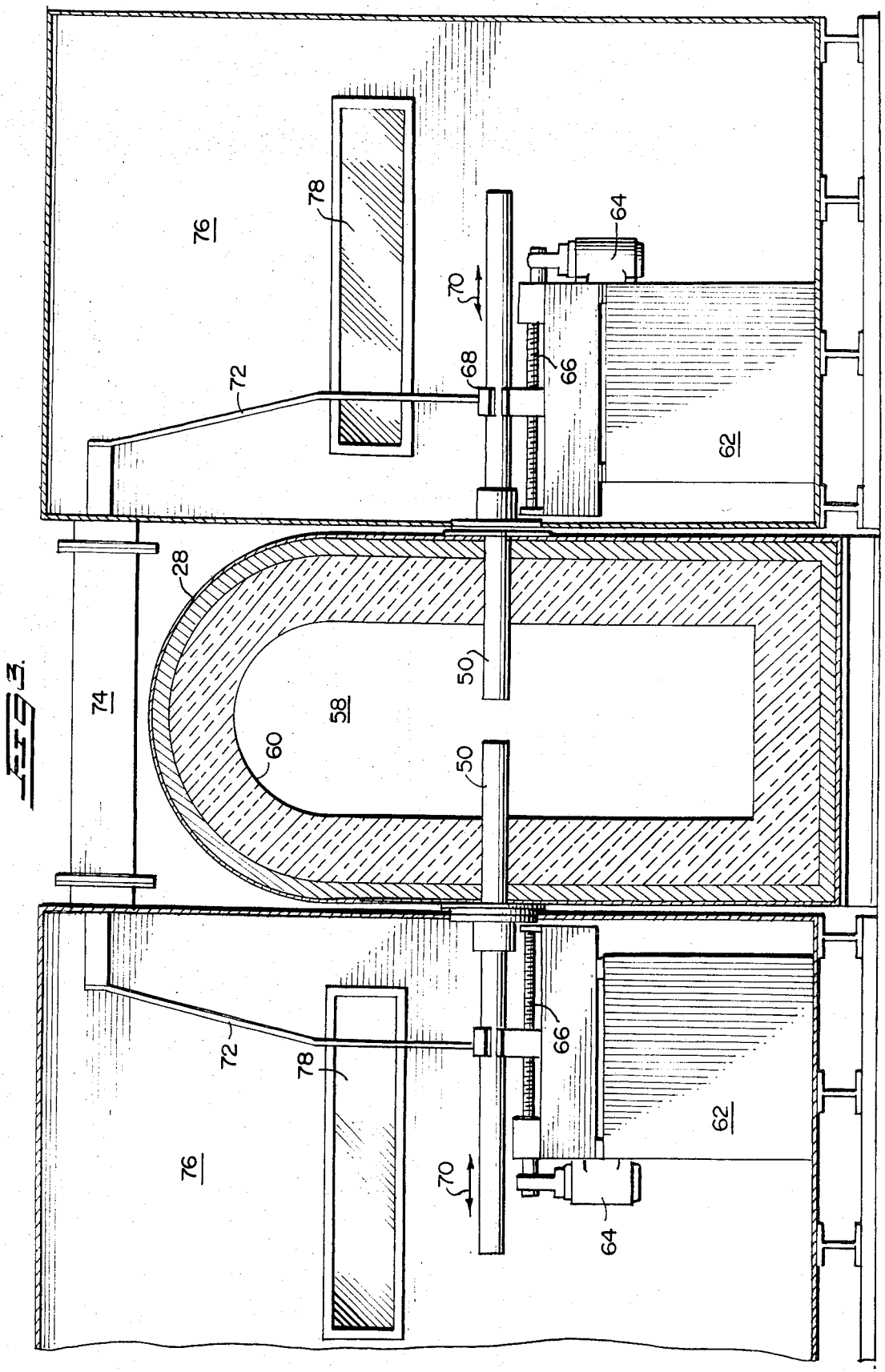

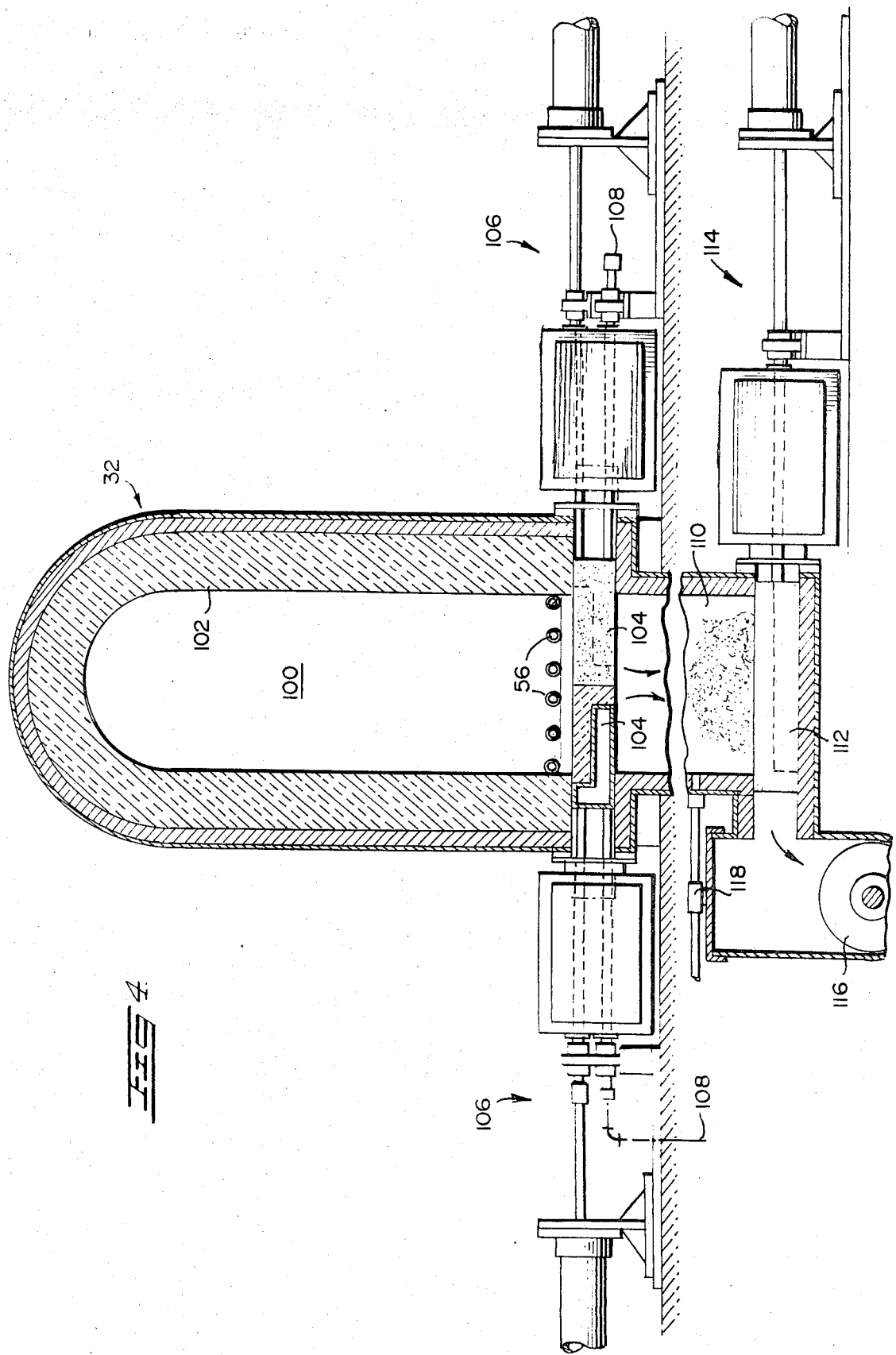

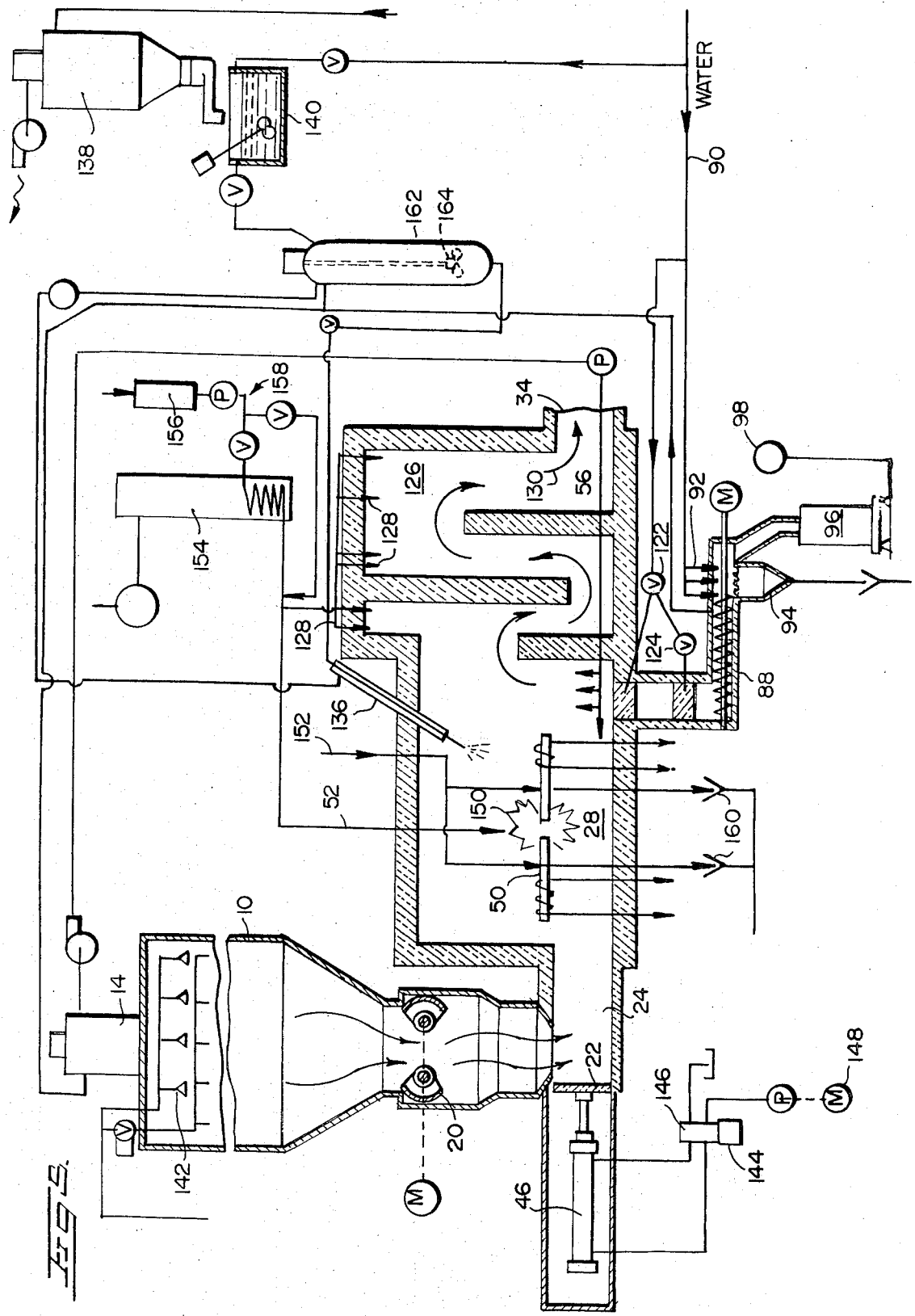

3,780,675

PLASMA ARC REFUSE DISINTEGRATOR

BACKGROUND OF THE INVENTION

The problem of waste disposal is an ever growing one and a need exists for an economical and efficient method and system for disposal of all waste materials. Industrial and municipal waste disposal create a problem carrying with it the existence of additional air and water pollution which is a very substantial one and efforts are being made to reduce air pollution and others resulting from current methods of solid waste disposal such as open burning incineration and land fill, etc., which are unsanitary, costly and taxing. It has been estimated that current methods contribute millions of tons of pollutants to environmental air each year and staggering projected costs for cleanup of air pollution caused by solid waste disposal are estimated. Available facts and figures underscore a growing awareness and concern with a need for immediate, positive and effective action in the area of waste disposal.

In the past, several solutions have been offered to alleviate the problem. However, none have been satisfactorily permanent. Most have been costly. Some have compounded the situation.

The present invention, system and apparatus offer a meaningful long term solution to the existing problems.

SUMMARY OF THE INVENTION

The present invention is for a system of waste disposal which virtually eliminates environmental pollution through using the thermal disintegration concept. This is accomplished by a plasma arc refuse disintegrator for an effective non-pollutant solid waste disposal system. Solid waste materials are reduced to an ionized gaseous state through heat oxidation, leaving only sterilized residues. The result is almost total elimination of all materials introduced into the system.

The system and method of the invention provide optimum results in the continuous thermal reduction of solid wastes from the standpoint of known process and economic requirements as follows:

1. Maximum volume reduction (in excess of 97 percent) to produce only sterile ash and slag.
2. Complete oxidation of all combustible materials.
3. Complete oxidation of gaseous products of combustion.
4. Discharge of clean gases into the atmosphere after minimal treatment of air pollution control.
5. Instantaneous release of internal heat content from all classes of unsorted combustible refuse.
6. Use of an external heat source which will accomplish complete combustion without adding additional pollutants to the atmosphere.
7. Economic installation and operating costs based on an overall dollar/ton figure.
8. Compact design with efficient utilization of space in areas close to the source of refuse.
9. Elimination of all sorting, screening, and classifying operations prior to oxidation.
10. Automated operation requiring little operator training or skill.

Particulars of the system and method will be more readily apparent from the following description of an embodiment thereof when taken together with the accompanying drawings in which:

FIG. 1 is a pictorial perspective view of the system of the invention;

FIG. 2 is a detailed longitudinal sectional view taken along line 2—2 of FIG. 1 disclosing the intercompartmental cooperation of the compartments comprising the invention as illustrated in FIG. 1;

FIG. 3 is a transverse detailed sectional view taken along line 3—3 of FIG. 1 more clearly showing the plasma arc section and associated drive and adjustment mechanism of the electrodes for plasma emission;

FIG. 4 is a transverse detailed vertical sectional view taken along line 4—4 of FIG. 2 showing in greater detail the ash pit and associated removal mechanisms; and FIG. 5 is a schematic view and combined flow sheet showing a typical arrangement of the system of the invention.

Referring now to the drawings, FIG. 1 pictorially and schematically shows an overall system of the invention. A storage bin 10 receives material through inlet 12 by any conventional method and in most instances this storage bin will place materials in a slight vacuum with a fabric dust collector for venting. The dust collector 14 vents dust through conduit 16 with the refuse fumes adapted for injecting into a plasma arc reactor for oxidation to prevent raw refuse fumes from reaching the atmosphere. The exhaust vent is shown at 18. The refuse is gravity fed from storage bin 10 through a self-cleaning duplex gate generally indicated at 20 which is operated hydraulically and controlled by the reactor feeder ram. The feed ram is generally indicated at 22 and functions to push and compact the material in and through feed chute 24 to a ready area at 26 forming a seal between the atmosphere and interior gases in the reactor area. The reactor area or plasma zone section is generally indicated at 28 in which electrodes are operably disposed for creating the plasma arc. The electrode housing and feeding sections are indicated at 30. In operation, after reaching a predetermined point, the ram retracts, activating the storage bin gate and allowing a specifically metered amount of additional refuse to enter the feed chute. The ram will then extend again, forcing the compacted materials into the reactor chamber. Operating on a time cycle, the ram feed action will be automatically regulated by the weight, volume and moisture content of refuse. The materials in the reactor or plasma zone or section will be reduced to an ionized gaseous state through heat oxidation and the off gas or waste heat then flows into a secondary section 32 which includes a series of baffles which serve to reverse flow of the off gas and reduce emission of fly ash. After passing through the secondary section, the exhaust gases flow through exhaust gas stack 34 for further processing in a cyclone separator 36 or the like having outlet exhaust 38 and fines collection 40.

A sectional view as shown in FIG. 2 more clearly shows various portions of the mechanism shown in FIG. 1. The refuse moves through and out of the storage bin 10 as indicated by arrows 42 through the silo gates or self-cleaning duplex storage bin gates 20 and pass into the feed chute 24 wherein the feed ram 22 is reciprocably mounted as indicated by arrows 44 by means of a hydraulic ram cylinder 46 as explained above. The materials as compacted upon entering the reactor section 28 are subjected to modulated primary air through inlet conduit 48 and the electrodes for the plasma arc are schematically shown at 50 in FIG. 2. Preheated air and recycled stack gas enters the reactor zone through conduit 52 and optionally chemical solution can be introduced through chemical solution conduit 54.

Considering a unit with a feed rate of 4,000 pounds per hour, each stroke of the ram will move approximately 75 cubic feet or from 600 to 4,000 pounds, according to the type of refuse, into the reactor. This will occur only one to seven times per hour and, accordingly, retention time will be sufficient for complete preheating of the material. Jets of preheated air flowing countercurrently across the reactor floor including air through grate air header conduit 56 will increase turbulence and mixing and add to the retention of time. Entrained water will be vaporized and combustibles will be oxidized as they reach their individual ignition temperatures in the reactor. The face of the wall of the refuse will continuously erode as it approaches the plasma zone. The preheat zone temperature will be maintained preferably at approximately 2,500°F. by radiation from the arc and burning combustibles so that most of the refuse will be reduced prior to entering the plasma zone. All steam, gaseous products and fly ash will pass through the plasma zone en route to the stack. In this zone the steam will be superheated and the other products completely oxidized. As the remaining solids enter the plasma zone they will be contacted from both sides by two jets of air, each heated to plasma temperatures by the arc from two carbon electrodes 50 in each cell.

The electrodes 50 extend into reactor chamber 58 (FIG. 3) having interior walls of refractory as at 60 to prevent deterioration. A standard indirect fired electrical furnace electrode set is used with an integral constant voltage drive, water cooled seals and carriages. The electrodes are controlled by electrode drive units 62 which operate from motors 64 to rotate screws 66 coacting with threaded nuts 68 to move the electrodes as indicated by arrows 70 to the appropriate spacing of the electrodes to effect the most efficient plasma arc therebetween. The nuts 78 are interconnected by flexible cables 72 and header 74. Much of this aforementioned mechanism is located in housings 76 for safety and having observation windows at 78. When operating, and as is known, the plasma arc temperatures will be in the 6,000°F. range. The electrode units can be such as those manufactured by the Detroit Electric Rocking Furnace Co. and are of a type of electrodes controlled by constant voltage drives common to indirect arc electric furnaces used for metallurgical applications. Different configurations are possible. For large units the electrodes can be mounted parallel to the axis of the reactor and the hot gas moved against the refuse by the preheated air inlets which create the plasma. For smaller units the electrodes are mounted at right angles with the reactor and the refuse passed directly beneath the arc. Plasma zone temperatures are automatically controlled by standard high temperature infra-red pyrometers. Exit gas temperatures can be maintained at a preset level by a tempering air blower with a motorized valve bypass to the stack. All steam, gaseous product and fly ash produced by preheat will also pass through the plasma zone en route to the stack. This serves to superheat the steam and completely oxidize all other products.

Residue or slag after passing through the plasma section and into the secondary section is evacuated into a slag receptacle 80 as indicated in FIG. 2, the flow shown by arrow 82. Different types of residue removal devices can be used. In FIG. 2, a controller of refractory 84 is positioned at the inlet to the slag receptacle and manually controlled shut off gate 86 is provided of a silo type construction. In operation, residue collects on top of the refractory lined duplex gate with the manual gates being similar to a Halliburton dual rotor valve. Periodically, or at a signal, the gate opens to allow refuse to charge a ribbon flight screw conveyor 88 (FIG. 5) optionally equipped with a hollow shaft. As the duplex gate closes, cooling water from a water supply 90 is admitted through nozzles in such a hollow shaft to quench the slag and ash. Residue is carried out the end of the conveyor and into a cylindrical perforated drum attached by rods to the screw conveyor shaft. As the drum rotates, either high pressure water or air jets continue to cool the residue as indicated at 92 and assist in separating the particle sizes. Fine particles will sift through the perforations and be carried down a drain (wet system) 94 or through a rotary air lock and into a pneumatic conveyor for removal to a storage bin (dry system) and the oversize particles are dumped into a separate bin 96 for separate removal. An indication of too large a proportion of the overs will be registered by an alarm 98 which will indicate a need for adjustment.

For smaller units requiring no size classification or screening of the residue an arrangement and construction as shown in FIG. 4 can be used. The heat zone is here indicated at 100 which is, of course, internally refractory lined as indicated at 102, and operatively disposed at the bottom are refractory lined water cooled rams 104 normally hidden in the fire brick recesses in the incinerator wall. These extend simultaneously through drive mechanism generally designated 106 operable to force residue toward the open chute. Water cooling is effected through conduits 108. The use of two counteracting rams instead of one has two advantages, i.e., a long unsupported cantilever beam effect is minimized and secondly, the two rams meet at the end of their strokes to form a seal to minimize cool air leakage into the heat zone. Residue either falls or is forced down the chute 110 onto the top of a third ram 112 of similar construction to the other two except that in addition to a return line for removing cooling water sprays can be provided on the ram face serving to quench the residue as it forces it out into the inlet of a screw conveyor or the like. Driving controls for this third ram are indicated at 114 with the screw conveyor shown at 116 and means for cooling jets indicated at 118 for the screw conveyor and at 120 for the ram. In operation, the rams and quench spray valves 122 and 124 (FIG. 5) are controlled for sequential operation so that there is never any opening between the heat zone and the screw conveyor. The screw conveyor runs continuously. The container for quenched slag and ash can be set on load cells and cleaned or changed periodically when full.

In the secondary section 32 a series of baffles 126 serve to reverse the flow of the off-gas (waste heat) and subject it to cooling air from nozzles at 128, the flow direction being indicated by arrows 130. The gases are also subjected to a water spray indicated at 130 through water spray nozzle 132. The water spray additionally serves for cooling and a water drain is provided at 134. This latter described construction in conjunction with complete oxidation and a low velocity exit chamber design will minimize the emission of fly ash.

Such ash as still flows through duct or exhaust stack 34 is treated in cyclone separator 36 or the like. Because the reactor chamber and feed chute are well sealed, nitrogen-oxide formation, normally created by extreme high temperatures, will also be minimized.

In practicing the invention, organic acids will be oxidized. Other acid pollutants will be neutralized by the introduction of a fluid chemical into the plasma air jets as indicated at 136 in FIG. 5 effected from line storage bin 138 into mix tank 140 and thence in the form of a thin calcium or magnesium hydroxide slurry. The alkaline injection material and the pollutants combine and precipitate into a relatively small volume of granules which in turn are automatically removed from the incinerator along with slag and other non-combustibles. The precipitated material should act as a fluxing agent for converting ash to a dense, low volume marketable slag which might find uses in various construction areas. If desired, the precipitates can be calcined under controlled conditions and the gases liberated, separated and collected for reuse with the solid material milled and dissolved in water for recycling through the incinerator.

A typical flow sheet for the system is shown in FIG. 5. As shown, water or other additives to the refuse in storage bin 10 can be effected through nozzles and sensors 142 with the refuse passing through silo gates 20 into chamber 24 for movement by ram 22 controlled by solenoid 144, valve 146 and motor 148 as hereinbefore described. As the material moves into the plasma section 28 where the plasma arc 150 is created by electrode set 50, the refuse is subjected to combustion. Cooling water for the electrodes is introduced by conduits indicated at 152. The preheated air introduced at 52 is from pre-heater 154 through which stack gases can be recycled and the air passed through filter 156 and appropriately controlled by pump and valving combinations 158. The fumes drawn off from the stored refuse after passing through filter 14 are recycled by conduit 56. The cooling water for the electrodes is exhausted at 160.

The chemical mix from tank 140 passes through charging vessel 162 having stirrer 164 therein. The system provides for automated control depending upon the nature of the emission. As level in charging vessel 162 falls below a given level, power air inside the vessel is vented back into the mix tank and refills the vessel to a desired high level condition which serves to close introduction valves for the materials and opens valves to feed the charging vessel. A commercially available stack monitoring instrument can be used to detect and record quantities of various emissions to transmit a DC signal which when converted to a pneumatic signal, for example, will control the flow of solution into the injector 136. $NO_2$ and $NO_x$ detection cells of the monitor can also be used to control the volume of under fire air which will also be useful in maintaining the pollutants at a viable level. Recirculating stack gases to use oxygen existing in CO thus reducing nitrogen intake will also lessen the amount of $NO_2$ and $NO_x$ released from the stack. The thinnest possible slurry and highest line velocities for the injection along with pitched lines should be used to prevent plugging. Return lines to prevent accumulation of stagnant solids can also be incorporated.

After heating of the materials to plasma temperatures and the reduction of the solid waste materials to an ionized gaseous state through heat oxidation only sterilized residues will remain and in the secondary section the gases are further treated as hereinbefore described so that the final emission is substantially pollutant free.

Manifestly, minor changes in details can be effected without departing from the spirit and scope of the invention as defined in and limited solely by the appended claims.

We claim:

1. A refuse disintegrator comprising:
   A. a reactor section;
   B. means in said reactor section for creating a plasma arc therein, including:
      i. opposed electrodes mounted therein; and
      ii. means for controlling electrode gap adjustment and operation for an optimum plasma arc and plasma zone temperatures;
   C. a refuse feeder for feeding refuse into said reactor for thermal disintegration therein by said plasma arc;
   D. discharge means from said reactor section for discharging residue remaining following the thermal disintegration; and
   E. a secondary section subsequent to said reactor section to receive gases and waste heat from said reactor section and treat the gases for removal of residue particles carried thereby and to cool said gases for emission of clean and cooled air into the atmosphere.

2. A refuse disintegrator comprising:
   A. a reactor section;
   B. means in said reactor section for creating a plasma arc therein, including:
      i. opposed electrodes extending thereinto;
      ii. energizing means for said electrodes; and
      iii. electrode drive units for moving said electrodes to appropriate spacing in said section and with respect to one another to effect an optimum efficient plasma arc therebetween;
   C. high temperature infra-red pryometers controlling electrode operation and plasma zone temperatures in said reactor section;
   D. a refuse feeder for feeding refuse into said reactor for thermal disintegration therein by said plasma arc;
   E. discharge means from said reactor section for discharging residue remaining following the thermal disintegration; and
   F. a secondary section subsequent to said reactor section to receive gases and waste heat from said reactor section and treat the gases for removal of residue particles carried thereby and to cool said gases for emission of clean and cooled air into the atmosphere.

3. A refuse disintegrator comprising:
   A. a reactor section;
   B. means in said reactor section for creating a plasma arc therein, including:
      i. opposed electrodes extending thereinto;
      ii. energizing means for said electrodes; and
      iii. electrode drive units for moving said electrodes to appropriate spacing in said section and with respect to one another to effect an optimum efficient plasma arc therebetween;
   C. a refuse feeder for feeding refuse into said reactor for thermal disintegration therein by said plasma arc;

D. means for flowing jets of preheated air countercurrently across the floor of said reactor to effect increased turbulence and mixing and add to retention time of refuse being burned therein;

E. discharge means from said reactor section for discharging residue remaining following the thermal disintegration; and F. a secondary section subsequent to said reactor to receive gases and waste heat from said reactor section and treat the gases for removal of residue particles carried thereby and to cool said gases for emission of clean and cooled air into the atmosphere.

4. A refuse disintegrator as claimed in claim 3, wherein said electrodes are mounted parallel to the axis of the reactor and hot gas moved against the refuse by preheated air inlets which create the plasma.

5. A refuse disintegrator as claimed in claim 3, said electrodes being mounted at right angles with respect to the reactor and refuse passing therethrough is passed directly beneath the arc created by the electrodes.

6. A refuse disintegrator comprising:
A. a reactor section;
B. means in said reactor section for creating a plasma arc therein;
C. a refuse feeder for feeding refuse into said reactor for thermal disintegration therein by said plasma arc;
D. discharge means from said reactor section for discharging residue remaining following the thermal disintegration;
E. a secondary section subsequent to said reactor section to receive gases and waste heat from said reactor section and treat the gases for removal of residue particles carried thereby and to cool said gases for emission of clean and cooled air into the atmosphere; and
F. said discharge means from said reactor section comprising a slag receptacle, an opening intercommunicating the interior of the reactor secondary section and said slag receptacle, controllable shutoff gate means for operatively opening or closing said gate means, and cooling water means for cooling said gate means and quenching slag and ash passing therethrough.

7. A refuse disintegrator as claimed in claim 6, said gate means including refractory lined water cooled rams recessed in the base and walls of said secondary section and being movable to opening and closing positions of the opening therefrom into said slag receptacle, said rams adapted to meet at the end of their strokes to form a seal and minimize air leakage into the heat zone, said rams being operable upon closing to force residue toward said opening for discharge into said slag receptacle.

8. A refuse disintegrator as claimed in claim 7, including a slag chute intercommunicating said opening and said slag receptacle, a slag ram movably disposed to open and close the bottom end of said chute, said ram adapted to receive on the upper surface thereof residue from said chute and being movable to eject residue from said slag receptacle, slag conveyor means at the outlet of said slag receptacle for receipt of slag impelled therefrom by said ram, water cooling means for said ram and cooling liquid injection means for selectively injecting cooling liquid onto slag in said slag receptacle when disposed on the upper surface of said ram.

9. A refuse disintegrator comprising:
A. a reactor section;
B. means in said reactor section for creating a plasma arc therein;
C. a refuse feeder for feeding refuse into said reactor for thermal disintegration thereby said plasma arc;
D. discharge means from said reactor section for discharging residue remaining following the thermal disintegration;
E. a secondary section subsequent to said reactor section to receive gases and waste heat from said reactor section and treat the gases for removal of residue particles carried thereby and to cool said gases for emission of clean and cooled air into the atmosphere; and
F. said secondary section including a plurality of internal opposed baffles defining therebetween a tortuous path for gases emitted from said reactor section, means for injecting cooling air into said secondary section to effect a cooling of such gas and means for injecting a water spray into said secondary section for further cooling of gases and precipitation of minute residue particles therein, and means for draining said water from said section.

10. A refuse disintegrator as claimed in claim 3, including means for introducing an alkaline material solution into the area of plasma arc and plasma air jets, the alkaline injection material and pollutants being combined and precipitating into granules for removal along with slag and other non-combustibles remaining after refuse combustion.

11. A refuse disintegrator as claimed in claim 10, including monitoring means for exhaust gases operatively controlling flow of alkaline injection material into the plasma arc area to control pollutant emission by enhanced acid neutralization and material precipitation.

12. A refuse disintegrator comprising:
A. a reactor section;
B. means in said reactor section for creating a plasma arc therein;
C. a refuse feeder for feeding refuse into said reactor for thermal disintegration there by said plasma arc;
D. discharge means from said reactor section for discharging residue remaining following the thermal disintegration;
E. a secondary section subsequent to said reactor section to receive gases and waste heat from said reactor section and treat the gases for removal of residue particles carried thereby and to cool said gases for emission of clean and cooled air into the atmosphere; and
F. said refuse feeder including a storage bin adapted to receive raw refuse, gate means operable to open or close the base of said bin for selective periodic discharge of refuse therefrom, a feed chute disposed below said bin adapted for receipt of refuse therein, said feed chute opening at one end thereof into said reactor section, a feed ram movable in said feed chute and operable to force compacted refuse into said reactor chamber, said ram controlling, in its movement, opening and closing of said gate in said bin.

* * * * *